United States Patent [19]

Schulz

[11] 4,064,861
[45] Dec. 27, 1977

[54] DUAL DISPLACEMENT ENGINE

[76] Inventor: William J. Schulz, R-239, West Cornwall, Conn. 06796

[21] Appl. No.: 713,106

[22] Filed: Aug. 10, 1976

[51] Int. Cl.$^2$ ............................................. F02D 13/06
[52] U.S. Cl. ................................................ 123/198 F
[58] Field of Search .............. 123/198 F, 97 R, 97 B, 123/DIG. 1, DIG. 6, DIG. 7, DIG. 8

[56] References Cited

U.S. PATENT DOCUMENTS

| 1,101,935 | 6/1914 | Jacobs et al. | 123/198 F |
| 1,409,625 | 3/1922 | Vosbmik | 123/198 F |
| 2,114,655 | 4/1938 | Leibing | 123/198 F |
| 2,166,968 | 7/1939 | Rohlin | 123/198 F X |
| 2,247,299 | 6/1941 | Klavik | 123/198 F UX |
| 2,528,983 | 11/1950 | Weiss | 123/198 F |
| 3,270,724 | 9/1966 | Dolza | 123/198 F |

Primary Examiner—Charles J. Myhre
Assistant Examiner—Ira S. Lazarus
Attorney, Agent, or Firm—Russell J. Egan

[57] ABSTRACT

A system is disclosed for use in connection with a conventional Otto or four cycle, multi-cylinder, internal combustion engine with the system being adapted to selectively disable half of the operating cylinders of the engine whereby substantial fuel economies can be realized. The present system is adapted to be used as an attachment on a conventional automotive engine and is equally applicable to four, six, and eight cylinder engines. The system disables selected cylinders by both inhibiting flow of fuel to the cylinder and disabling the exhaust valve in an open condition so that the disabled cylinder will, in effect, be free wheeling in that it does not use fuel or produce unused compression which must be overcome by the remaining cylinders.

9 Claims, 3 Drawing Figures

DUAL DISPLACEMENT ENGINE

BACKGROUND OF THE INVENTION

1. The Field of the Invention

The present invention relates to a system for realizing economy of operation of an internal combustion engine and, in particular, to a system for selectively disabling up to half of the cylinders of an operating engine.

2. The Prior Art

It has long been realized that there is the possibility of effecting economy of operation of internal combustion engines by disabling at least a portion of the cylinders when the power afforded by the extra cylinders is not necessary. This type of operation is generally known as split engine operation and is the possibility of effecting economy of operation of internal combustion engines by disabling at least a portion of the cylinders when the power afforded by the extra cylinders is not necessary. This type of operation is generally known as split engine operation and is explained in a basic reference, namely, U.S. Pat. No. 2,954,022. It is noted in the above-mentioned patent that considerable economies can be realized when it is possible to resort to split engine operation, for example, being able to operate an 8-cylinder engine on 4 cylinders under moderate load conditions. The economy is effected by the fact that individual cylinder efficiency is increased when the individual cylinder load is increased during split engine operation in contrast to reduced cylinder loads as occur with full engine operation during light or moderate load conditions.

It is an inherent characteristic of internal combustion engines to be most efficient under high load conditions. This is attributable to the fact that the quantity of the air fed to the cylinders is applied in the maximum amount when the throttle is fully open, indicative of a high load, therefore more air may be compressed, in turn increasing the compression ratio. Since engine efficiency increases with compression pressure, the compression pressure increases with cylinder load, the desirability of split or part cylinder engine operation as a means for maintaining high cylinder loads becomes apparent. However, all previous systems, which have attempted to effect such a split engine operation have been overly complicated.

One attempt to effect economic engine operation by reduction of operating cylinders is disclosed in U.S. Pat. No. 3,874,358 wherein some of the cylinders are fully disabled by being replaced with dummy modules. Thus, the disabled cylinder is not available for re-entry into the system should the operator encounter an emergency situation requiring additional power.

U.S. Pat. No. 2,394,739 disclosed a device for controlling the valve operation in an internal combustion engine to selectively disable cylinders by holding their exhaust valves closed. This type of invention has a definite advantage over the device mentioned in U.S. Pat. No. 3,874,358 since the cylinders are only temporarily disabled and will still be available for use if and when it is necessary.

U.S. Pat. Nos. 2,166,968, 2,875,742, 2,919,686, 2,596,640, and 3,874,358 show representative devices which control the operation of an internal combustion engine by selectively allowing flow of the fuel charge to the cylinders. In each case, when full power is needed, the fuel charge is directed to all of the cylinders. However, when more moderate conditions prevail, the fuel charge is directed to less than the total number of cylinders.

SUMMARY OF THE INVENTION

The present invention relates to a method and apparatus for effecting economy of operation of an internal combustion engine by selectively disabling cylinders of a multi-cylinder engine by both inhibiting flow of fuel to the selected cyliners and locking up the exhaust valve of those cylinders in the open condition. The flow of fuel to each selected cylinder is inhibited by actuation of an auxiliary butterfly valve located between the intake manifold and the cylinder so that no fuel will be consumed thereby. The exhaust valve of each selected cylinder is disabled in an open condition so that, while no fuel is consumed by the cylinder, it will not be developing unneeded compression which would form an additional load to be overcome by the remaining cylinders.

It is therefore an object of the present invention to produce a system for selectively disabling cylinders of a multicylinder engine whereby economy of engine operation can be effected.

It is another object of the present invention to produce a system for effecting economy of operation of a multi-cylinder Otto or four cycle, internal combustion engine which will selectively disable half the cylinders by preventing flow of fuel to the selected cylinders.

It is still another object of the present invention to produce a system which will effect the economy of operation of a multi-cylinder, Otto or four cycle, internal combustion engine under low and medium load conditions by disabling selective cylinders of the engine through locking open the exhaust valves of selected cylinders whereby unnecessary compression will not be built up in the engine.

It is yet another object of the present invention to produce a system for effecting economy of operation of a multi-cylinder, Otto or four cycle internal combustion engine by selectively disabling some of the cylinders of the engine by both inhibiting flow of the fuel to the selected cylinders while locking open the exhaust valves thereof.

It is a further object of the present invention to produce a system for improving the economy of internal combustion engines which system can be readily and economically produced.

The means for accomplishing the foregoing objects and other advantages will become apparent to those skilled in the art from the following detailed description taken with reference to the accompanying drawings.

DETAILED DESCRIPTION OF THE PREFERRED EMBODIMENT

The present invention will be explained in combination with a single cylinder of a conventional Otto cycle (four cycle) internal combustion engine having 4, 6, or 8 cylinders, with the valves operated by overhead cam shafts and with carbureated fuel. It should be noted that the valves could be operated by push rods and/or the fuel injected without substantially effecting the operation of the present invention. Only those portions of a conventional internal combustion engine which are essential for understanding of the present invention will be discussed in detail.

Figure 1:
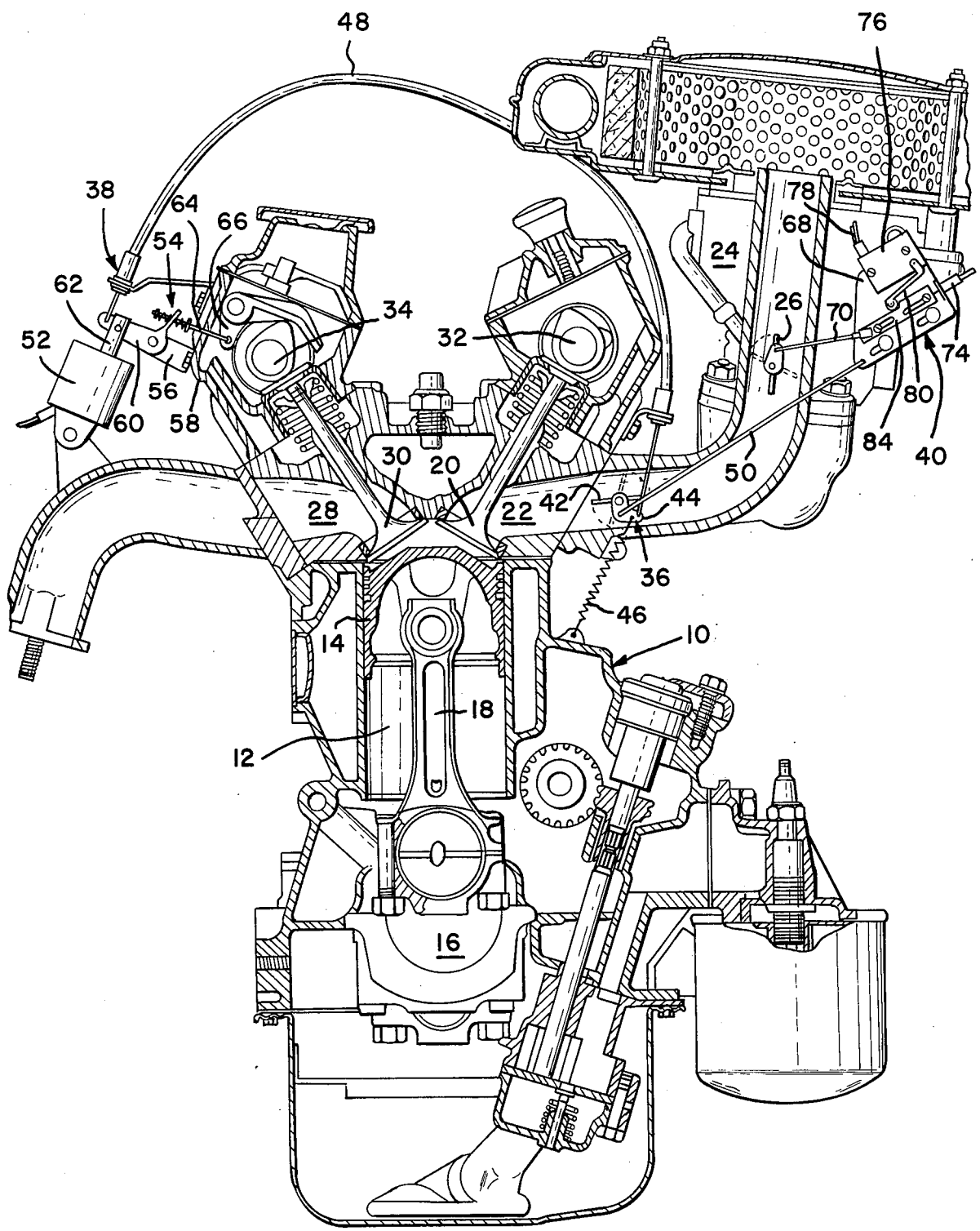
FIG. 1 is a vertical transverse section through a single cylinder of a conventional multi-cylinder internal combustion engine equipped with the present invention and operating in the power mode.

FIG. 1 is a vertcial transverse section taken through a single cylinder of a conventional in line multi-cylinder internal combustion engine. The engine 10 has a plurality of operating cylinders 12 each having a piston 14 moved therein by an associated crank shaft 16 and piston rods 18. Each cylinder is also provided with a fuel intake valve 20 connected to one branch of an intake manifold 22 leading to a carburetor 24 which includes a butterfly valve 26 for controlling the amount of fuel and air mixture drawn into the cylinders. The cylinder is also connected to an exhaust manifold 28 by an exhaust valve 30. Both valves 20 and 30 are shown being controlled by an overhead cam assemblies 32, 34, respectively.

The present invention is inserted into such a conventional engine with very little modification of the engine itself. The subject invention includes an auxiliary throttle assembly 36, an exhaust valve lock-up assembly 38 and a micro-switch cam control assembly 40.

The auxiliary throttle assembly 36 is located in the fuel intake manifold 22 and includes a butterfly valve plate 42, a crank arm 44, a spring 46, a flexible cable 48, and linkage 50. The crank arm 42 is fixedly attached to valve plate 42. Spring 46 is attached to the crank arm 44 to normally bias the valve plate 42 to the open condition of the power mode shown in FIG. 1. The flexible cable 48 is connected between the crank arm 44 and the exhaust valve lock-up mechanism 38. Linkage 50 is a rigid member connected between the crank arm 44 and the micro-switch cam control 40.

The exhaust valve lock-up mechanism 38 includes a solenoid 52 and linkage assembly 54 comprising a mounting bracket 56 fixed to the valve cam housing 58, a first crank arm 60 pivotally mounted on the mounting bracket 56 with cable 48 and the piston rod 62 of solenoid 52 connected on one end and spring loaded link 64 connected on the other end. A second crank 66 arm is pivotally mounted within the cam housing with one end connected to link 64 and the other end adapted to a position locking exhaust valve 30 in an open condition.

The micro-switch cam control assembly 40 includes a control plate 68 slidably mounted on a fixed bracket (not shown). Control plate 68 is connected to the main engine butterfly valve 26 by linkage 70, to the auxiliary butterfly valve assembly 36 by linkage 50, and to the accelerator pedal 72 by flex cable assembly 74. A micro-switch 76 is mounted on control plate 68 and is electrically connected by wires 78 to control solenoid 52. The micro-switch 76 also includes a control arm 80 having roller 82 on the free end thereof. A cam 84 is slidably mounted on control plate 68 with profiled cam surface 86 engaged by roller 82.

The subject invention operates by the auxiliary throttle plate 42 in the intake manifold 22 controlling the flow of the air/fuel charges to the "in or out" cylinder while the respective exhaust valve is held open by the exhaust valve lock-up mechanism 38. Thus, in the economy mode, the engine will be running on a lesser displacement in order to reduce compression loading, and hence the power loss, while less fuel is being consumed. Control is effected through the throttle linkage from the accelerator and is completely automatic. The whole mechanism is activated by the micro-switch 76, operated by a single solenoid 52, and powered by the auto's electrical system.

In the power mode, see FIG. 1, the carburetor throttle plate 26 is open indicating high power operation. The micro-switch 76 is in the open condition so that the solenoid 52 is de-energized with it's piston 62 pulled out by return spring 46 through cable 48 and crank arm 44. The exhaust valve latch arm 66 is in a retracted position permitting normal operation of the exhaust valve 30. Auxiliary throttle butterfly valve plate 42 in the intake manifold 22 is fully open permitting admission of an air/fuel charge to the cylinder. The control plate 68 is in the long position giving a lesser opening of throttle plate 26 for a given accelerator setting. This means that all cylinders of the engine are receiving a smaller air/fuel charge and are developing less power per cylinder. However, with a greater total number of cylinders operating, consumption and engine power output are greater. It should be noted that the throttle linkage shift is really relevant only to making a smooth transition from one mode to the other. The full range of throttle responses from the idle to full power still remain available to the operator.

Figure 2:
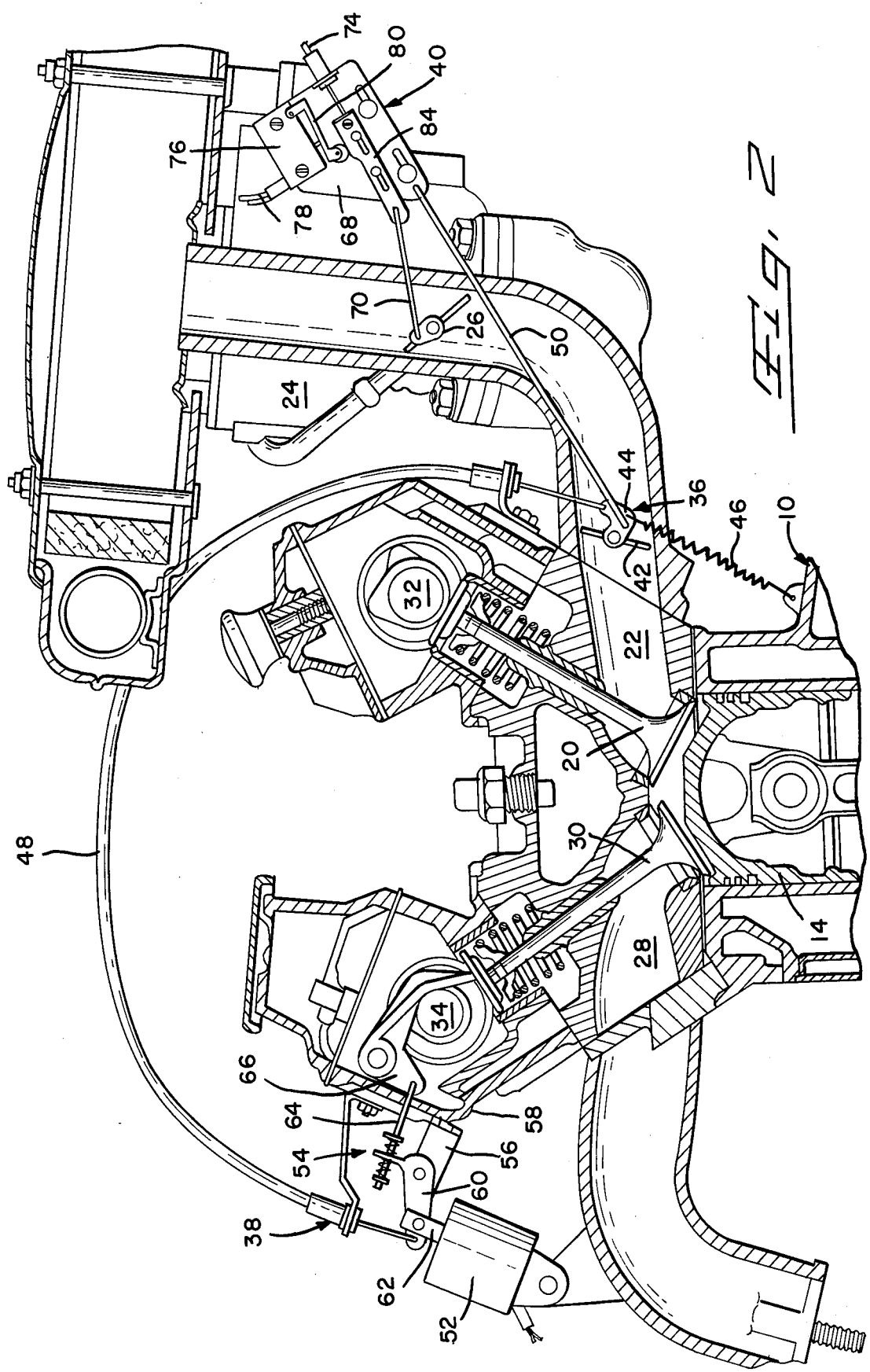
FIG. 2 is an enlarged detailed vertical transverse section of the upper portion of the engine of FIG. 1 showing the cylinder operating in the economy mold.

The economy mode is illustrated in FIG. 2. The carburetor throttle plate 26 is shown nearly closed indicating a cruise or low power situation. The micro-switch 76 is in a closed condition to energize the solenoid 52 which in turn pulls in its piston rod 62 against the force of spring 46. The exhaust valve latch arm 66 is pivoted by arm 60 and linkage 64 to engage the exhaust valve 30 to lock it open thereby reducing compression loading in the selected cylinder. Auxiliary throttle plate 42 in the intake manifold 22 is closed preventing admission of air/fuel charge to the cylinder. The control plate 68 is in the short position giving a greater opening of the throttle plate 26 for a given accelerator setting. This means that the operating cylinders are receiving a greater air/fuel charge and are developing more power per cylinder while the total number of cylinders is reduced and thereby decreasing the total fuel consumption.

Figure 3:
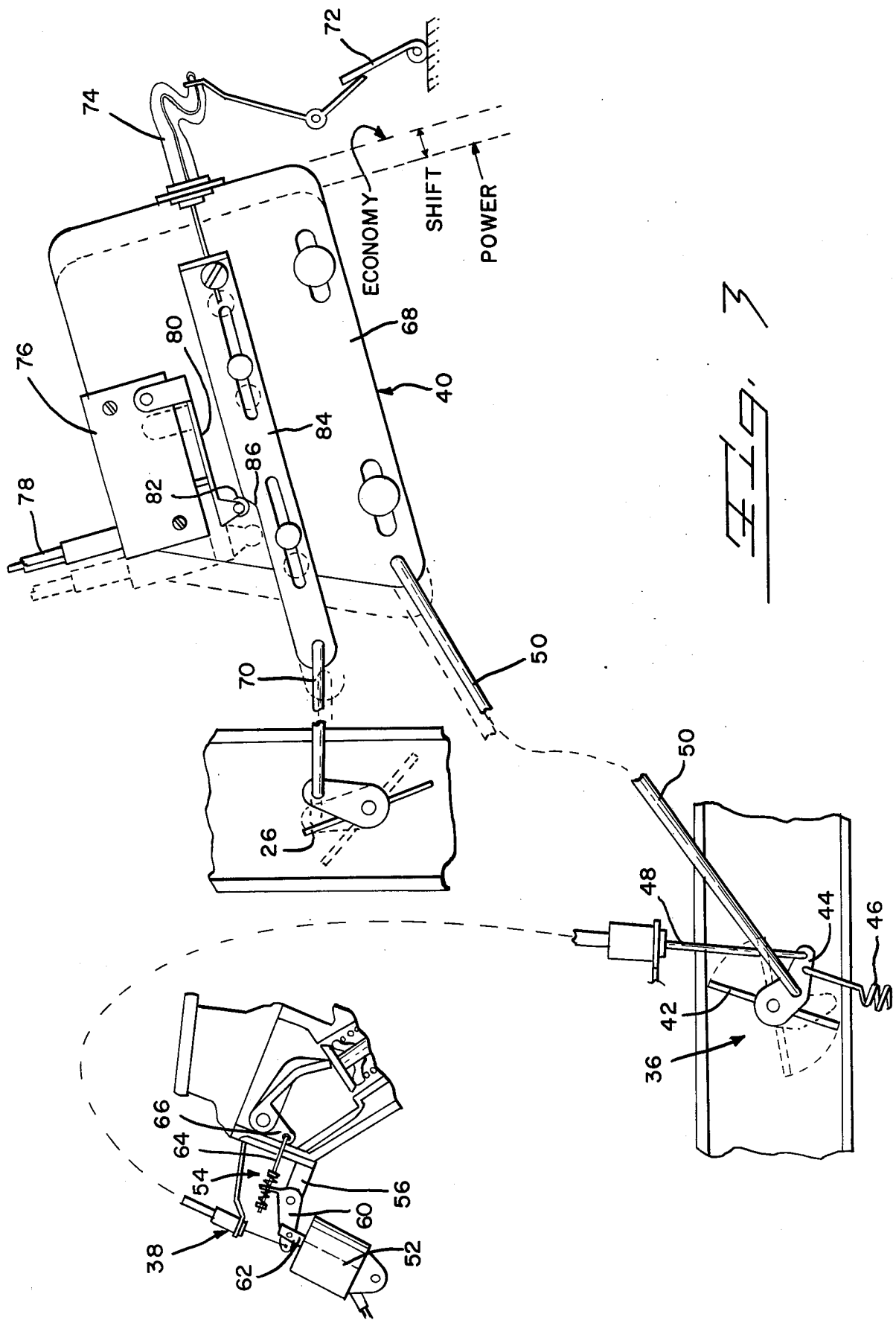
FIG. 3 is a schematic representation of the components of the present invention.

The details of the micro-switch cam control assembly 40 are shown in FIG. 3 with the economy mode in solid lines and the power mode in phantom. The carburetor throttle plate 26 is mostly in the open condition. The micro-switch 76 is shown closed in the economy mode so that solenoid 52 is energized, auxiliary throttle butterfly valve plate 42 closed and latch arm 66 holding exhaust valve 30 open. As the accelerator 72 is depressed ever so slightly, it pulls on the throttle cable 74 to shift cam 84 sufficiently for roller 82 to drop off the ramp of the cam surface 86 to open switch 76. The carburetor throttle plate 26 is momentarily pulled to a more open position by the movement of cam 85 but a shift of cam control assembly 40 to the short power position effects a lesser opening of the throttle plate 26. Opening of switch 76 de-energizes solenoid 52 and its piston rod 62 is drawn out by spring 46 via cable 48. Movement of rod 62 causes latch arm 66 to be pivoted to free exhaust valve 30. Spring 46 will act on crank arm 44 to open valve plate 42 and cause linkage 50 to shift control plate 68 to the power position.

Relative to the exhaust valve latching linkage 54, it is spring loaded to permit the solenoid 52 to operate at the moment of energization of de-energization without having to wait for synchronization of the valve at full lift. This way the latching or unlatching action is "cocked" and operates the next time the cam lifts the valve sufficiently to permit the latch to move to or from the retracted position.

The subject control system is actuated as the accelerator 72 is pressed toward the stroke end and the microswitch 76 is open cutting the power to the solenoid 52 which in turn: (a) releases the exhaust valve latch 66, (b) opens the auxiliary throttle valve plate 44, and (c) changes the geometry and length of the accelerator linkage which reduces the throttle opening thus giving a smooth transition from the economy to power modes rather than a difficult to handle and dangerous sudden increase of displacement and power. When pressure on the accelerator 72 is eased, the micro-switch 76 is closed activating the solenoid 52 which: (a) latches the exhaust valve 30 open, (b) closes the auxiliary throttle valve plate 42, and (c) changes the geometry and length of the accelerator linkage opening the carburetor throttle plate 26 somewhat to compensate for the reduced displacement. This produces a smooth transition from power to economy modes without feeling that the car is falling on its face because of a loss of power. It should be noted that fuel injection engines would additionally have shut-off valves in the fuel lines to the in or out cylinders which operate automatically the same as the mechanism described above.

While the present invention has been described as it would be employed on half the total number of cylinders available, it is within the review of the present invention to apply it to less than half of the cylinders and/or to arrange the invention to work progressively adding and/or deleting cylinders according to requirements.

The present invention may be subject to many changes and modifications without departing from the spirit or essential characteristics thereof. The present embodiment is therefore to be considered in all respects as illustrative and not restrictive of the scope of the invention.

What is claimed is:

1. An apparatus for disabling at least one selected cylinder of a conventional four cycle, multi-cylinder, internal combustion engine under light load conditions in order to effect operational economy, said apparatus comprising:
    auxiliary valve means located in an intake manifold leading to each selected cylinder;
    valve lock-up means acting on an exhaust valve of each selected cylinder to lock said exhaust valve in an open condition, said lock-up means comprising a solenoid having a piston rod, a linkage assembly one end of which is attached to said piston rod and the other end of which is movable out of and into a position in which said exhaust valve is held open; and
    control means responsive to actuation of an accelerator and means connecting said control means to said auxiliary valve means and said solenoid for controlling operation of said auxiliary valve means and said exhaust valve lock-up means whereby, under low load conditions, said selected cylinder is disabled by closure of said auxiliary valve and locking open said exhaust valve.

2. An apparatus according to claim 1 wherein said auxiliary valve means comprises:
    a butterfly valve movably mounted in said intake manifold;
    a crank arm fixed to said butterfly valve;
    spring means connected to said crank arm biasing said butterfly valve to a normally open condition; and
    means connecting said crank arm to said control means.

3. An apparatus according to claim 1 further comprising:
    spring means in said linkage assembly allowing immediate movement of said solenoid piston rod upon energization of said solenoid and cocking of said other end of said linkage assembly for movement into a locking position upon the next sequential opening of said exhaust valve.

4. An apparatus according to claim 1 wherein said auxiliary valve means comprises:
    a butterfly valve movably mounted in said intake manifold;
    a crank arm fixed to said butterfly valve;
    spring means connected to said crank arm biasing said butterfly valve to a normally open position;
    means connecting said crank arm to said control means; and
    means connecting said crank arm to said piston rod of said solenoid whereby said auxiliary valve is closed upon energization of said solenoid.

5. An apparatus according to claim 1 wherein said control means comprises:
    a control plate;
    switch means fixedly mounted on said control plate and connected to control actuation of said valve lock-up means;
    cam means slidably mounted on said control plate to actuate said switch means;
    first linkage means connecting said control plate to a main engine fuel/air charge control;
    second linkage means connecting said control plate to actuate said auxiliary valve means; and
    means connecting said control plate to said accelerator to be responsive to the movements thereof.

6. An apparatus according to claim 5 wherein said control plate is movably mounted whereby said main engine fuel/air charge control is additionally opened upon closure of said auxiliary valve means.

7. An apparatus according to claim 1 wherein half the cylinders of said engine are disabled.

8. An apparatus according to claim 1 wherein said exhaust valves are actuated by overhead cams.

9. An apparatus according to claim 1 wherein said engine uses carbureted fuel.

* * * * *